United States Patent [19]

Brodeur

[11] Patent Number: 5,803,270
[45] Date of Patent: Sep. 8, 1998

[54] METHODS AND APPARATUS FOR ACOUSTIC FIBER FRACTIONATION

[75] Inventor: Pierre Brodeur, Smyrna, Ga.

[73] Assignee: Institute of Paper Science & Technology, Inc., Atlanta, Ga.

[21] Appl. No.: 550,750

[22] Filed: Oct. 31, 1995

[51] Int. Cl.[6] .................................................. B03B 5/28
[52] U.S. Cl. ........................ 209/155; 209/210; 209/638
[58] Field of Search .................................. 209/155, 158, 209/159, 638, 483, 454, 497, 503, 210

[56] References Cited

U.S. PATENT DOCUMENTS

| | | | |
|---|---|---|---|
| 4,523,682 | 6/1985 | Barmatz et al. | 209/638 |
| 4,737,268 | 4/1988 | Giddings | 209/210 |
| 4,743,361 | 5/1988 | Schram | 209/158 |
| 4,877,516 | 10/1989 | Schram | 209/155 |
| 4,941,135 | 7/1990 | Schram | 209/155 |
| 5,006,266 | 4/1991 | Schram | 209/155 |
| 5,039,426 | 8/1991 | Giddings | 209/210 |
| 5,527,460 | 6/1996 | Trampler et al. | 209/155 |

OTHER PUBLICATIONS

"Motion of Fluid–Suspended Fibres in a Standing Wave Field," by P. Brodeur, from *Ultrasonics*, vol. 29, pp. 302–307, (1991).

"Acoustic Radiation Pressure on a Rigid Cylinder: An Analytical Theory and Experiments," by Junru Wu, et al., from *J. Acoust. Soc. Am.*, vol. 87, No. 2, pp. 581–586, (Feb. 1990).

"Fiber Characterization in a Stationary Ultrasonic Field," by Pierre Brodeur, et al., reprinted from *IEEE Transactions on Ultrasonics, Ferroelectrics, and Frequency Control*, vol. 36, No. 5, pp. 549–553, (Sep., 1989).

Technical Brief entitled "Acousto–Optical Fiber Characterization," by J. J. Garceau, et al., from *Tappi Journal*, pp. 171–173, (Aug. 1989).

"Caractérisation Acousto–Optique des Fibres: Nouveaux Résultats," by J.–L Dion, et al., from *Journal of Pulp and Paper Science*, vol. 14, No. 6, pp. J141–J144, (Nov. 1988).

"On the Acoustic Radiation Pressure on a Prolate Spheroid," by Jōbu Awatani, from *Memo. Inst. Sci. Ind. Res.*, Osaka U., vol. 10, pp. 58–65 (1953).

"Radiation Force Acting on a Cylindrical Particle in a Sound Field," by A. P. Zhuk, from *Institute of Mechanics, Academy of Sciences of the Ukrainian, SSR*, Kiev., *Plenum Publishing Corporation*, pp. 689–693, (1987).

"On the Acoustic Radiation Pressure on Circular Discs: Inertia and Diffraction Corrections," by Louis V. King, et al., taken from *Proc. Roy. Soc.*, London, vol. 153A, pp. 1–40, (1935).

"On the Acoustic Radiation Pressure on Spheres," by Louis V. King, et al., taken from *Proc. Roy. Soc.*, London, vol. 147A, pp. 212–240 (1934).

*Primary Examiner*—Joseph E. Valenza
*Attorney, Agent, or Firm*—Fitch, Even, Tabin & Flannery

[57] ABSTRACT

Methods and apparatus for acoustic fiber fractionation using a plane ultrasonic wave field interacting with water suspended fibers circulating in a channel flow using acoustic radiation forces to separate fibers into two or more fractions based on fiber radius, with applications of the separation concept in the pulp and paper industry. The continuous process relies on the use of a wall-mounted, rectangular cross-section piezoelectric ceramic transducer to selectively deflect flowing fibers as they penetrate the ultrasonic field. The described embodiment uses a transducer frequency of approximately 150 kHz. Depending upon the amount of dissolved gas in water, separation is obtained using a standing or a traveling wave field.

21 Claims, 9 Drawing Sheets

20 WATTS (RMS)
ELECTRICAL POWER

40 WATTS (RMS)
ELECTRICAL POWER

60 WATTS (RMS)
ELECTRICAL POWER

80 WATTS (RMS)
ELECTRICAL POWER

ACOUSTIC CELL

TESTING CONDITIONS
- RAYON FIBERS
- 0.25% CONSISTENCY
- NO ACOUSTIC FIELD

ABSORBER

TRANSDUCER

FLOW DIRECTION

DIVIDER CELL

TESTING CONDITIONS
- RAYON FIBERS
- 0.25% CONSISTENCY
- NO ACOUSTIC FIELD

DIVIDER WALL

FLOW DIRECTION

METHODS AND APPARATUS FOR ACOUSTIC FIBER FRACTIONATION

BACKGROUND OF THE INVENTION

1. Field of the Invention

The present invention relates generally to the separation of wood pulp fibers into various fractions such as long and short fibers for efficiencies in the paper making process, especially concerning paper mill effluents containing pulp slurry recyclable through separation of large radius fibers and small radius fibers into a concentrated paper fiber stock of the relatively larger fibers for paper making and a clean stream of the relatively smaller fibers from a stream of dilute fiber suspension. More particularly the invention relates to an acoustic cell, an acoustic fractionator and methods of separating dilute suspensions of fibers for fiber fractionation with acoustic separation using acoustic wave fields. Such acoustic wave fields induce deflections of the fibers penetrating an ultrasonic field imposing agglomeration and reorientation on the fibers of fiber suspensions to separate the fibers into two or more fractions according to the relative sizes of the fibers.

2. Description of the Related Art

Separation of virgin or reclaimed wood pulp fibers into two or more fractions which are relatively enriched in longer or shorter fibers is an important step of the paper-making process, because it allows for the efficient use of fiber properties. Fiber fractionation allows an optimized use of raw materials, increases production versatility, and contributes to waste and energy consumption reduction. Typical examples are: optimization of multi-layered products by placing fractions where they are most needed in the sheet; energy savings by restricting pulp refining to the long-fiber fraction; separation of valuable fraction from waste.

Various technologies have been devised during the past forty years to fractionate wood pulp fibers. See, e.g., P. Seifert and K. L. Long, "Fiber fractionation—Methods and Applications," Tappi J., Vol. 57(10) pp. 69–72 (1974); and T. F. Skaar, "Fractionation: Equipment, Applications and Process Control," Proc. of the Pulping Conf., Tappi Press, pp. 211–216 (1984). Pressure screen systems, which fractionate fibers based on fiber length, are generally perceived as the most successful technology on a commercial standpoint. See, H. Ibrahim, "Fiber Fractionation—An appropriate Technology for Upgrading Recycled Fibers and Saving Energy," Proc. Eucepa Symp. "Recycling of Fibres and Fillers in Pulp and Paper Industry" Ljubljana pp. 539–569 (Oct. 23–27, 1989).

In pressure screen systems, pulp slurries circulate between a stationary cylinder-shape screen and an external rotor. Pressure conditions between the screen and the rotor are such that the short fibers pass through the screen; long fibers are retained on the screen. The separation efficiency depends upon pulp furnish, use of perforated or slotted screens, pulp consistency, and input and output flow rates. The technology has high throughput. However, pressure screens have limited on-line adaptability to variable pulp furnishes, and they also have limited on-line adaptability for variable product requirements. Also, separation efficiency is not always satisfactory and multi-stage systems are used to meet separation goals. These are drawbacks when one considers the ever increasing use of reclaimed fibers from mixed grades. Moreover, pressure screen systems cannot fulfill fractionation requirements based on fiber radius, wall thickness, or coarseness, especially the separation of springwood and summerwood fibers or the separation of softwood and hardwood fibers, or in the separation of shives from the fibers.

It would be desirable to employ a versatile mechanism facilitating on-line adaptability to variable pulp furnishes and variable product requirements such as fiber fractionation with acoustic separation using ultrasonic wave fields, but very little knowledge has been available on the interaction of a sound field with fibers and more generally with prolate spheroids and cylindrical particles. Awatani was the first to calculate the acoustic force on a prolate spheroid, J. Awatani, "On the Acoustic Radiation Pressure on a Prolate Spheroid," Memo. Inst. Sci. Ind. Res., Osaka U., Vol. 10, pp. 51–65 (1953), and a rigid circular cylinder, J. Awantani, "Study on Acoustic Radiation Pressure (IV), Radiation Pressure on a Cylinder," Memo. Inst. Sci. Ind. Res., Osaka U., Vol. 12, pp. 95–102 (1955), in plane traveling and standing wave fields. He found that the force on a prolate spheroid, whose axis of symmetry is perpendicular to the sound field direction (stable orientation), is larger than that on a disc or a sphere which has the same projective area. More recently, Zhuck and Wu et al. reported independent derivations of the acoustic force on a rigid cylinder at stable orientation, in plane traveling and standing wave fields, respectively. See, A. P. Zhuck, "Radiation Force Acting on a Cylinder Particle in a Sound Field," Sov. Appl. Mech., Vol. 22, pp. 689–693 (1987); and J. Wu G. Du, S. S. Work and D. M. Warshaw, "Acoustic Radiation Pressure on a Rigid Cylinder: An Analytical Theory and Experiments," J. Acoust. Soc. Am., Vol. 87, pp. 581–586 (1990).

SUMMARY OF THE INVENTION

The present invention teaches the use of a novel concept for the continuous separation of fibers into two or more fractions. The described embodiments are based upon the use of a plane ultrasonic wave field to induce lateral deflections of moving fiber suspensions in a channel flow, and therefore, separate fibers accordingly to the deflection mechanism. Since the acoustic radiation force acting on the fibers is primarily a function of the fiber diameter or radius (i.e., fiber width), large radius fibers are more deflected than small radius fibers. In practice, fibers interacting with the ultrasonic field can be collected by at least two discharge streams, one concentrated stream for the deflected fibers (large radius fibers) and one clean stream for the weakly deflected or undeflected fibers (small radius fibers and/or fiber debris).

It is an object of the present invention to provide methods and apparatus to overcome the problems and disadvantages of the prior art fractionation techniques.

It is another object of the present invention to separate paper fibers slurry into fractions concentrated and clean fiber streams for efficiencies in the paper making process with acoustic separation using ultrasonic wave fields to induce deflections of the fibers.

It is a further object of the present invention to provide an acoustic cell for subjecting dilute suspensions of fibers to deflection forces, the fibers being of differing relative sizes.

It is a still further object of the present invention to provide an acoustic fractionator for separating dilute suspensions of fibers into plural fractions according to the relative fiber sizes of differing fibers.

It is yet another object of the present invention to provide a method of separating dilute suspensions of fibers into plural fractions according to the relative fiber sizes of differing fibers.

Briefly, the present invention relates to methods and apparatus for acoustic fiber fractionation using an acoustic cell for subjecting dilute suspensions of fibers to deflection forces, the fibers being of differing relative sizes, and an acoustic fractionator for separating dilute suspensions of fibers into plural fractions according to the relative fiber sizes of differing fibers. The acoustic cell provides a tubular element for directing moving fiber suspensions in a channel flow, an input for receiving time varying signals, and a transducer for generating an ultrasonic field responsive to the time varying signals to induce deflections of the fibers imposing agglomeration and reorientation on the fibers of the fiber suspensions to separate the fibers into at least two fractions according to the relative sizes of the fibers.

The acoustic fractionator and a method of separating dilute suspensions of fibers into plural fractions according to the relative fiber sizes of differing fibers convey a feed stream of dilute fiber suspension, transfer the feed stream through an acoustic cell for directing moving fiber suspensions in a channel flow, generate an ultrasonic field upon the channel flow to induce deflections of the fibers in the acoustic cell imposing agglomeration and reorientation on the fibers of the fiber suspensions to separate the fibers into at least two fractions according to the relative sizes of the fibers and then divide the fiber suspensions at the down stream side of the acoustic cell to separate the fibers of the fiber suspensions into at least two fractions corresponding to at least two outlet streams of fibers according to the relative sizes of the fibers. The acoustic cell may have an absorber plate coupled to a wall section opposite the transducer for producing a traveling wave field, or in another embodiment, the acoustic cell may have a reflector plate coupled to the wall section opposite said transducer for producing a standing wave field.

The appended claims set forth the features of the present invention with particularity. The invention, together with its objects and advantages, may be best understood from the following detailed description taken in conjunction with the accompanying drawings.

DESCRIPTION OF THE PREFERRED EMBODIMENTS

Figure 1:
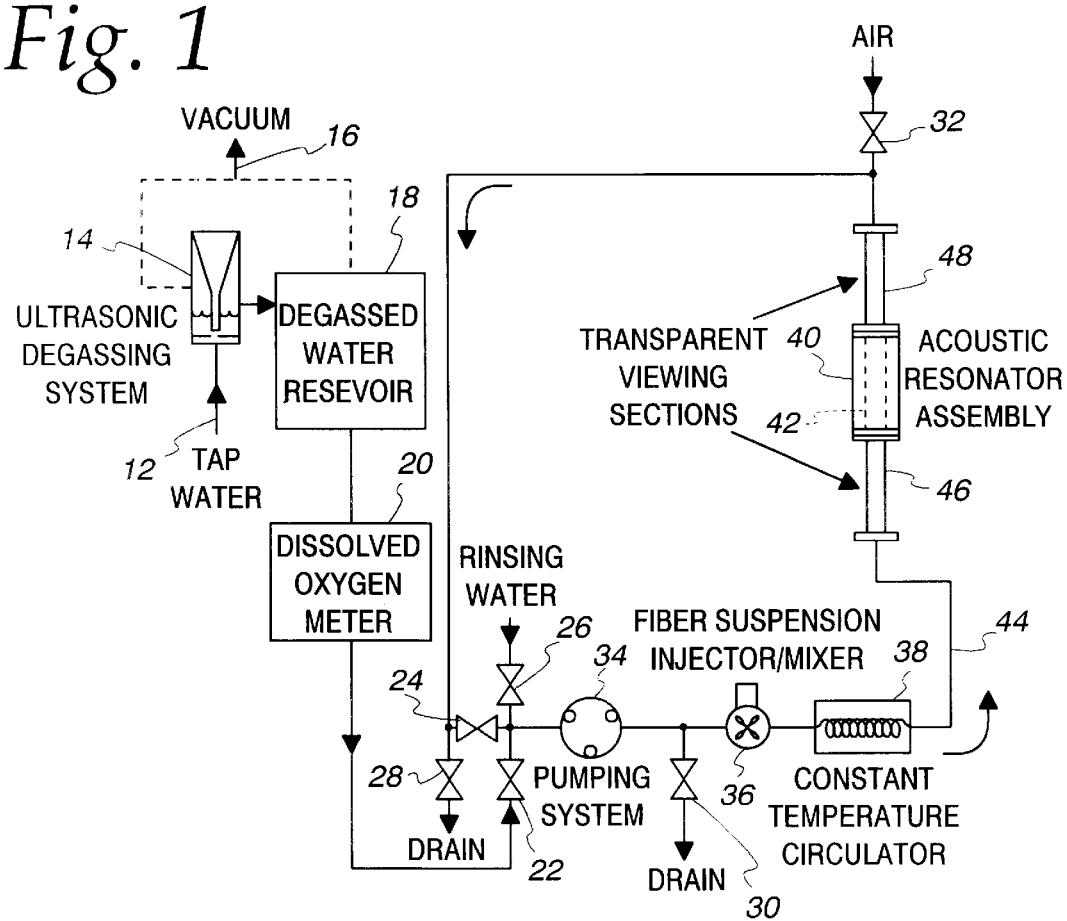
FIG. 1 shows an experimental setup for studying the acoustic radiation effects on moving fiber suspensions in accordance with the invention.
Figure 2:
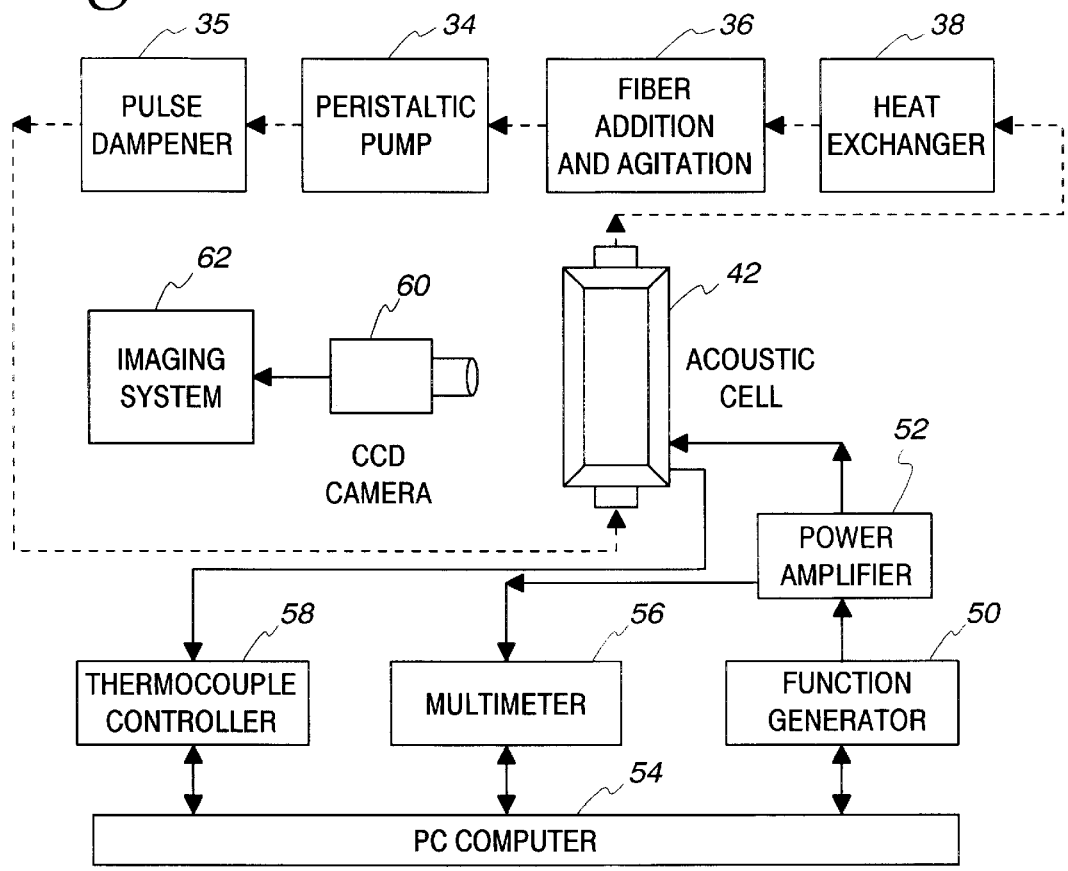
FIG. 2 shows a schematic block diagram thereof.

Reference will now be made in detail to the present preferred embodiments of the invention, examples of which are illustrated in the accompanying drawings. FIGS. 1 and 2 illustrate the experimental setup apparatus 10 to study moving fiber suspensions interacting with an ultrasonic wave field in a channel flow. The setup can accommodate zero-flow and laminar flow conditions; but the invention is directed to both laminar and turbulent flow conditions. The maximum allowed fiber consistency in the described embodiment is 1%. It should be noted however that the 1% fiber consistency in this embodiment is a limitation of the pumping equipment used for the subject experimentation, and is in no way representative of limitations on the concept described herein. In fact, consistency is not a limiting factor, it is anticipated that satisfactory acoustic fractionation will work at consistencies of 2–3% or more. A suspending fluid (tap or degassed water) is first introduced in the flow system at 12. This procedure provides a means to control the amount of dissolved gas in water when a standing wave field is prescribed; (experimentation as indicated that the standing wave system may require degassed water while the traveling wave system does not require degassed water). An ultrasonic degassing system 14 with vacuum 16 removes gas from the tap water which is stored in a degassed water reservoir 18 maintained under vacuum 16. The level of gas in the water introduced into the apparatus 10 may be measured with a dissolved oxygen meter 20. Fluid valves 22 and 24 direct the flow of the water in the apparatus 10. The flow direction is reversible. Rinsing water may be introduced at valve 26 and valves 28 and 30 are used to drain fluid from the apparatus 10; an air valve is provided at valve 32.

Fibers are injected and gradually mixed with the suspending fluid. A pump 34, herein a peristaltic pump is shown for moving a continuous feed of pulp slurry through a feed tube 44. Additionally the use of a centrifugal pump to obtain higher flow rates has been found beneficial, but in principal any pump may be used; a pulse dampener 35 may also be used (see FIG. 2). The initial consistency can be increased by simply adding more fibers with a fiber suspension injector/mixer 36 for fiber addition and agitation. A constant temperature circulator or heat exchanger 38 is used to control the temperature. An acoustic resonator assembly 40, including an acoustic cell 42, is coupled to the feed tube 44; transparent viewing sections 46 and 48 may be used to observe the feed stream. On the right side of FIG. 3, the in-line acoustic cell 42 (discussed below) is shown mounted vertically to decouple gravitational and ultrasonic fields.

A computer-controlled function generator 50 and a broadband power amplifier 50 are used to drive the acoustic cell 42; specifically at an input for receiving time varying signals coupled to the transducer of the cell, as discussed below. The electrical power is limited to approximately 100 Watts RMS to prevent damage to the transducer of the acoustic cell 42. The function generator 50 is controlled with a conventional PC Computer 54. The output of the power amplifier 52 may be measured by the computer 54 using a multimeter 56 interfaced to the computer 54. A thermocouple controller 58 is also interfaced to the computer 54 for coupling to the acoustic cell 42 to measure the temperature therein. A rod-mounted, calibrated, 5 mm diameter, sub-MHz P(VDF-TrFE) hydrophone (not shown) is used to evaluate field uniformity, pressure, and power. The wavelength is stabilized against temperature variations by using the computer-controlled temperature compensation system. A CCD camera 60 and an imaging system 62 are used to record fiber trajectories in the acoustic cell (see FIGS. 5A–5E below).

Separation methods using standing and traveling wave fields are considered here. Focusing on the first case, the acoustic radiation force acting on a unit length circular cylinder whose axis of symmetry is normal to a plane standing wave field is:

$$F_{SW} = f(\beta) \frac{\pi a^2}{2} \overline{E} k \sin[2kh] \quad (1)$$

where: a is fiber radius; $f(\beta)=[2(1-\beta)/(1+\beta)]+1$ is the inertia factor; $\beta=\rho_0/\rho_1$ is the radio of the suspending medium density to cylinder density; $k=2\pi/\lambda$; and $\lambda$ is the acoustic wavelength.

The mean energy density is represented as:

$$\overline{E}=(\rho_0 c)^2/(2\rho_0)$$

where: $\rho_0$ is the static pressure; c is the sound velocity; and h is the cylinder center of mass position with respect to a nodal velocity plane.

Equation (1) indicates that $F_{SW}$ is maximum halfway between particle velocity nodes and anti-nodes and inversely proportional to the acoustic wavelength. This specifies that the larger the cylinder radius, the larger the acoustic force. Providing that $\beta$ is less than 3, which is the case for a solid cylinder in a fluid, $f(\beta)$ is positive and so is $F_{SW}$. Thus, the agglomeration is toward the nearest particle velocity anti-node at stable acoustic equilibrium.

Similarly, A. P. Zhuck, "Radiation Force Acting on a Cylinder Particle in a Sound Field," above, derived an equation for the acoustic force acting on a cylinder in a traveling wave field which is represented as follows:

$$F_{tr} = f(\beta) \frac{\pi^2 \overline{E} k^3 a^4}{4} \quad (2)$$

Figure 3:
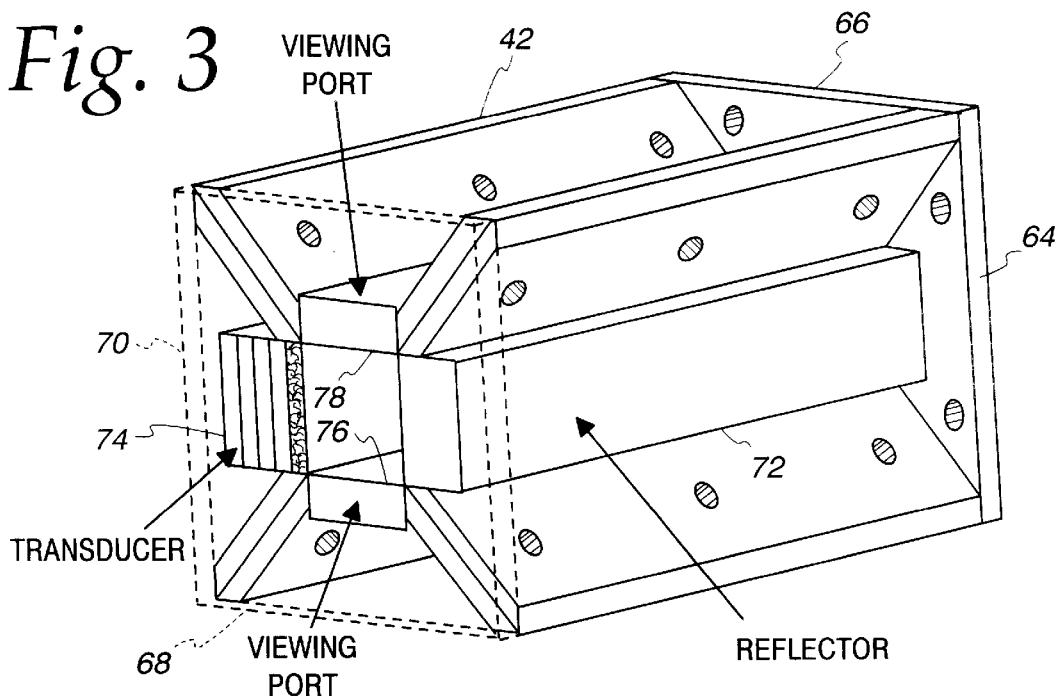
FIG. 3 shows the acoustic cell for the case of a one-dimensional, unbalanced acoustic resonator embodiment wherein the acoustic cell utilizes a reflector plate coupled to the wall section opposite said transducer for producing a standing wave field.

Turning now to FIG. 3, the acoustic cell 42 is designed to provide maximum flexibility, illustrating the case of a one-dimensional, unbalanced acoustic resonator. The acoustic cell 42 has four identical and removable modular wall sections 64, 66, 68 and 70 defining a tubular channel for fluid flow therein. These wall sections are individually used to support either a transducer, a reflector plate, an absorber plate, or a viewing port. Herein, wall section 64 supports a reflector 72 and wall section 70 supports a transducer 74 opposite the reflector 72 for this standing wave system. Wall sections 66 and 68 each support viewing ports 76 and 78 respectively as opposing glass windows for viewing the fiber trajectories in the acoustic cell therethrough. The nominal length and width of these components are 100 mm and 20 mm, respectively.

The narrow-band, single-element transducer 74 was designed to resonate nominally at 150 kHz. Its rectangular cross-section Insures that every fiber penetrating the ultrasonic field is submitted to the same acoustic dwell length. It is made of a piezoelectric ceramic material, but any device for generating an ultrasonic signal responsive to a time varying input will suffice the transducer 74. In the embodiment, slicing of the piezoelectric material, in the transducer 74, was used to optimize thickness mode vibrations and field uniformity. Considering an approximate sound velocity in water of 1500 m/s at room temperature, the acoustic wavelength is 10 mm. Since the resonator length (transducer-reflector distance) is 20 mm, $\lambda/2$ is 5 mm, and four agglomeration planes are expected when a standing wave field is produced. The quarter wavelength is 2.5 mm; it corresponds to the typical average fiber length for softwood fibers (less for hardwood fibers). The frequency of ultrasonic output of the transducer 74 is selected in such a way as to prevent contradictory forces acting upon softwood fibers in the presence of a standing wave field; otherwise, the precise frequency may be somewhat arbitrary, especially in the traveling wave field embodiment, discussed below.

Figure 4A:
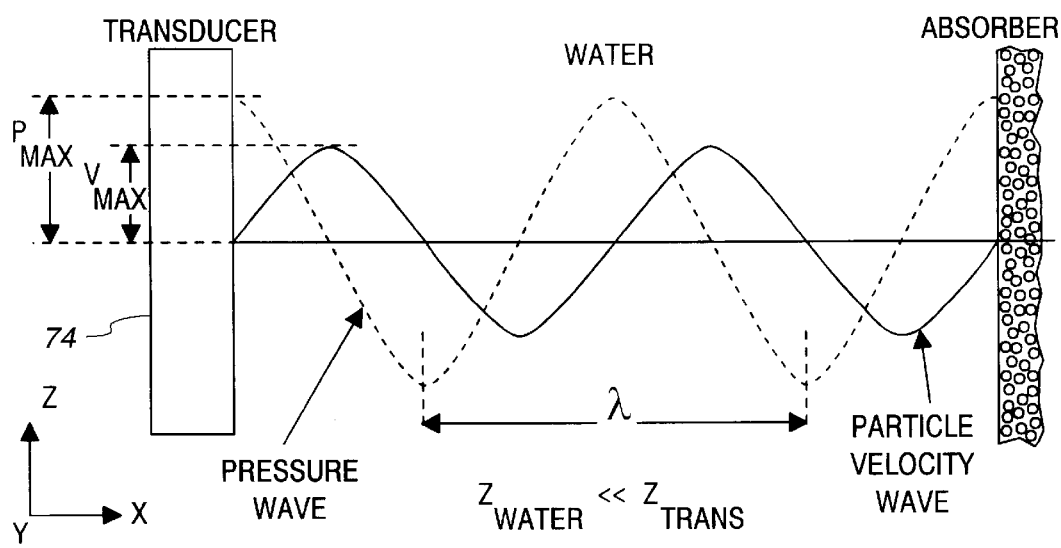
FIG. 4A illustrates a plane traveling wave acoustic field in the acoustic cell embodiment for producing a traveling wave field therein.
Figure 4B:
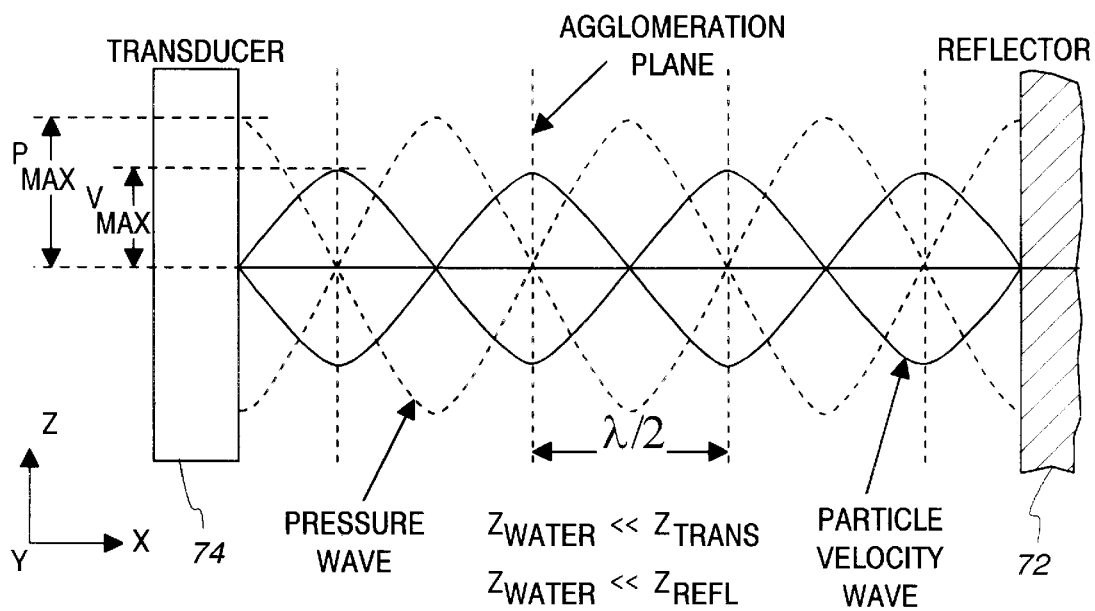
FIG. 4B illustrates a plane standing wave acoustic field in another acoustic cell embodiment for producing a standing wave field therein.

FIG. 4A shows a plane traveling wave acoustic field in the acoustic cell embodiment for producing a standing wave field, while FIG. 4B shows a plane standing wave acoustic field in the acoustic cell embodiment for producing a standing wave field. The traveling wave embodiment: of FIG. 4A illustrates the acoustic pressure wave and resulting particle velocity create agglomeration and reorientation of the fibers being concentrated toward the absorber. The standing wave embodiment of FIG. 4B illustrates the acoustic pressure wave and resulting particle velocity create agglomeration planes at half wavelength anti-nodes to induce deflections of the fibers penetrating the ultrasonic field imposing agglomeration and reorientation on the fibers of the fiber suspensions to separate the fibers into the several fractions illustrated according to the relative sizes of the fibers.

Figure 5A:
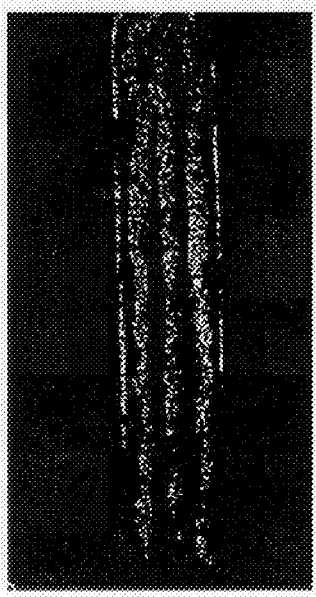
FIGS. 5A through 5D are photographs which illustrate deflections of the fibers penetrating an ultrasonic field imposing agglomeration and reorientation on the fibers of the fiber suspensions to separate the fibers into plural fractions with an acoustic cell embodiment having a reflector plate coupled to the wall section opposite said transducer for producing a standing wave field according to the invention.
Figure 5B:
Figure 5C:
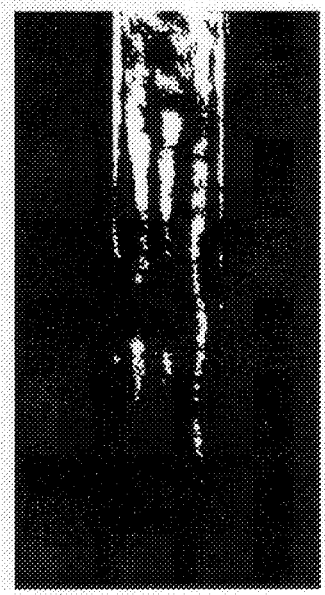
Figure 5D:

Qualitative experimental results were gathered using rayon fibers and reclaimed wood pulp fibers. Rayon fibers are man-made cellulosic fibers with known dimensions. In the first set of experiments, rayon fibers suspended in degassed water were used to investigate acoustic agglomeration in a standing wave field under zero-flow condition. Affects of fiber radius and consistency were examined. Selected results are reported in FIGS. 5A, 5B and 5C. The transducer's and reflector's positions are on the left and right sides, respectively. Black areas refer to fibers because of back illumination. Fiber dimensions and consistency are as follows; FIG. 5A (length: 3.2 mm; radius; 5.9 μm; 0.1% consistency); FIG. 5B (length; 3.2 mm; radius; 5.9 $\mu$m; 1% consistency); FIG. 5C (length; 3.2 mm; radius 10.2 $\mu$m; 1% consistency).

Four agglomeration planes or layers are observed. At constant fiber radius, the layer thickness increases when the consistency increases (FIGS. 5A and 5B). When the layer thicknesses for the 5.9 $\mu$m and 10.2 $\mu$m radius fibers at 1% consistency are compared (FIGS. 5B and 5C), one observes thinner layers for larger radius fibers. This is a consequence of the acoustic force depending upon the square of the radius (see Equation 1); the migration velocity is also increased. As discussed above, there is no indication that the 1% consistency is an upper limit. In fact a 2–3% consistency appears possible.

In a second set of experiments, the trajectory of rayon fibers suspended in degassed water was observed at 10 ml/s (FIG. 5D) and 50 ml/s flow rates (approximate figures). Flow velocities in the resonant cavity were 2.5 cm/s (R≈500) and 12.5 cm/s (R≈2500), respectively. The consistency was 1%. While the layers were well formed at R≈500 (laminar flow regime), they were barely seen when the flow rate was increased by a factor of five. Since the acoustic power and/or the acoustic dwell length could not be increased to enhance fiber deflection, it was not possible to determine if the acoustic force was hindered by an excessive level of turbulence.

Figure 5E:
FIG. 5E is a photograph illustrating deflections of the fibers penetrating an ultrasonic field imposing agglomeration and reorientation on the fibers of the fiber suspensions to separate the fibers into two fractions with an acoustic cell embodiment having an absorber plate coupled to a wall section opposite the transducer for producing a traveling wave field according to the invention at the upper limit of the laminar flow regime ($R \approx 2000$)
Figure 5F:
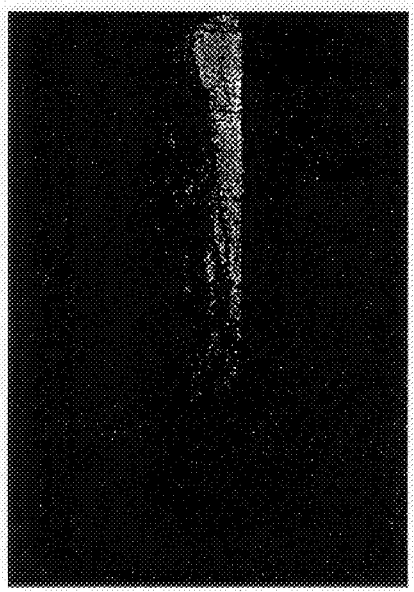
FIGS. 5F, 5G, 5H and 5I are photographs illustrating deflections of the fibers penetrating ultrasonic fields (at 20 Watts RMS, 40 Watts RMS, 60 Watts RMS and 80 Watts RMS, respectively) to separate the fibers into two fractions with an acoustic cell embodiment having an absorber plate coupled to a wall section opposite the transducer for producing a traveling wave field according to the invention in the turbulent flow regime ($R \approx 6000$)
Figure 5G:
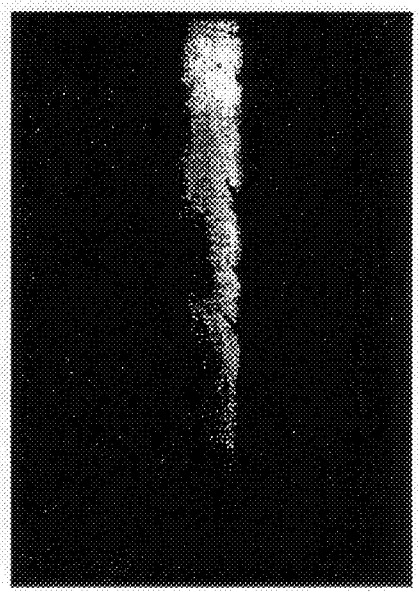
Figure 5H:
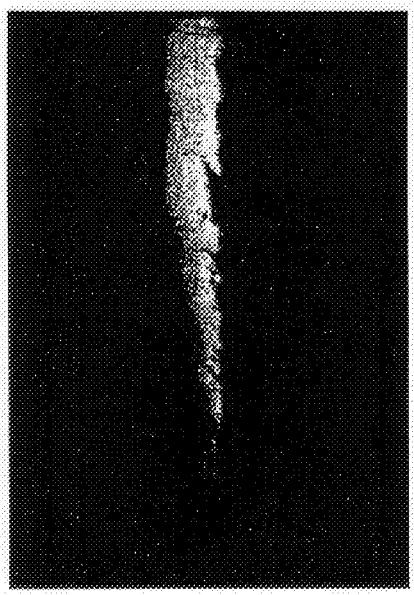
Figure 5I:
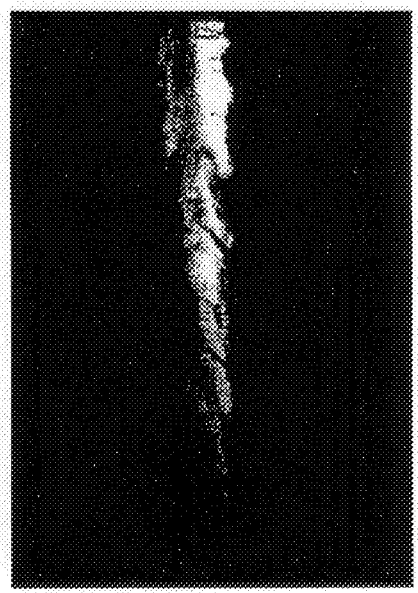

In another experiment, flowing reclaimed wood pulp fibers (more precisely, OCC or Old Corrugator Container fibers) were observed in a traveling wave field configuration. This is shown in FIG. 5E. The flow rate is 40 ml/s (flow velocity; 10 cm/s; R≈2000). The consistency is 0.5%. One can see that the fibers are pushed away from the transducer as they penetrate the field; they tend to follow a parabolic trajectory. Additional observations obtained using fiber debris (fines) under similar flow/acoustic conditions have shown that the debris are barely affected by the acoustic field. Hence, the separation of fibers and fiber debris is feasible.

With reference to FIGS. 5F–5I, yet another set of experiments were performed in the turbulent flow regime. FIGS. 5F, 5G, 5H and 5I are photographs illustrating deflections of the fibers penetrating ultrasonic fields at 20 Watts RMS, 40 Watts RMS, 60 Watts RMS and 80 Watts RMS, respectively. These observations were obtained with softwood fibers at 0.1% consistency. The flow rate was set constant to 7.21/min (2 gpm—gallon per minute). A centrifugal pump was used. Since the Reynold's number is approximately 6000, we have a turbulent flow regime. These four photographs illustrate fiber deflection changes as we increased the electrical power applied to the transducer (i.e., from 20 to 80 $W_{RMS}$). One can easily see that the fibers are more and more deflected against the absorber as the power is increased. If the pump that employed had been larger, it would have been possible to increase the flow rate and still observe fiber deflection and separation.

Figure 6A:
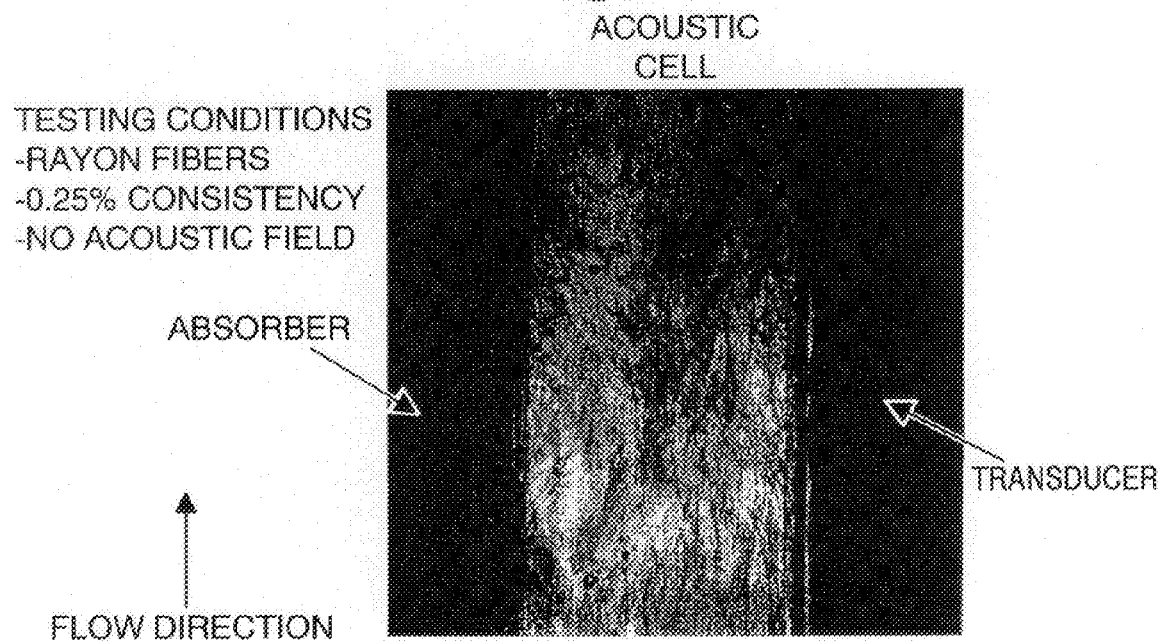
FIGS. 6A and 6B are photographs showing an acoustic cell and a divider cell under testing conditions where no acoustic field is applied to the acoustic cell.
Figure 6B:
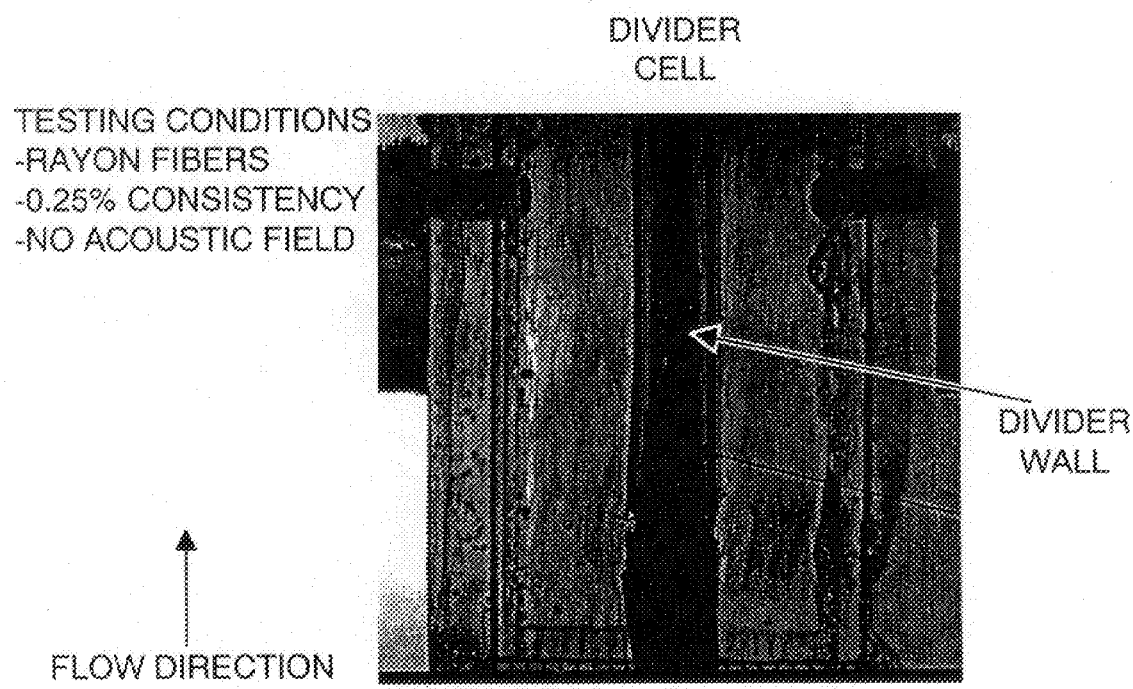
Figure 6C:
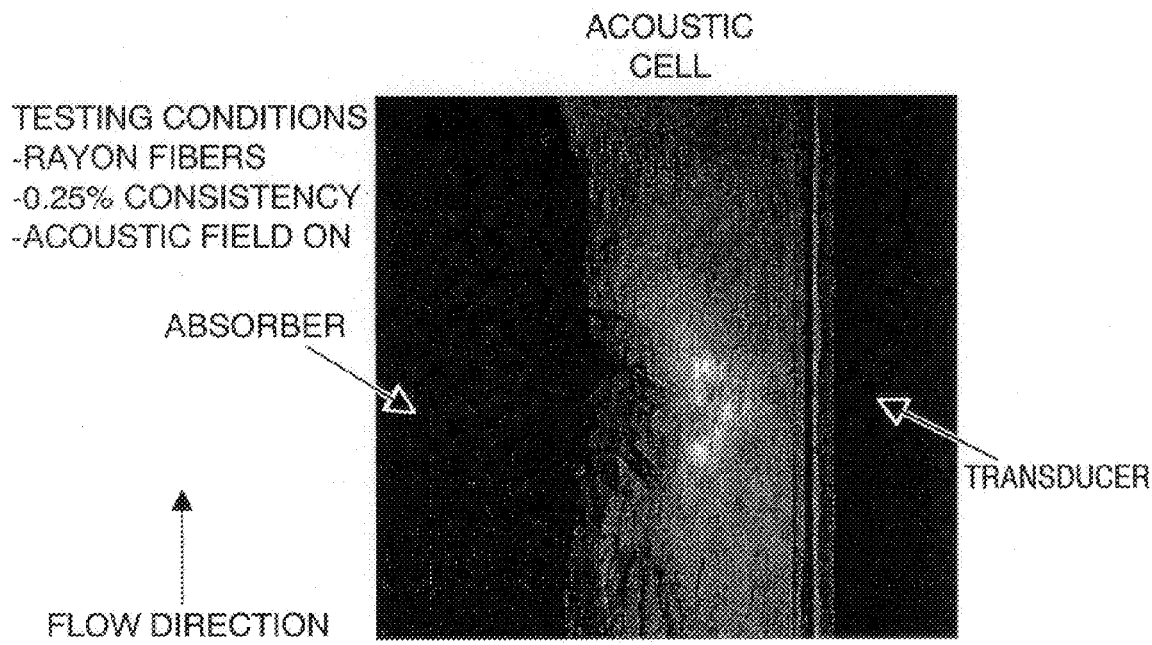
FIGS. 6C and 6D are photographs showing the acoustic cell and the divider cell under testing conditions when the acoustic field is applied to the acoustic cell, herein a traveling wave field.
Figure 6D:
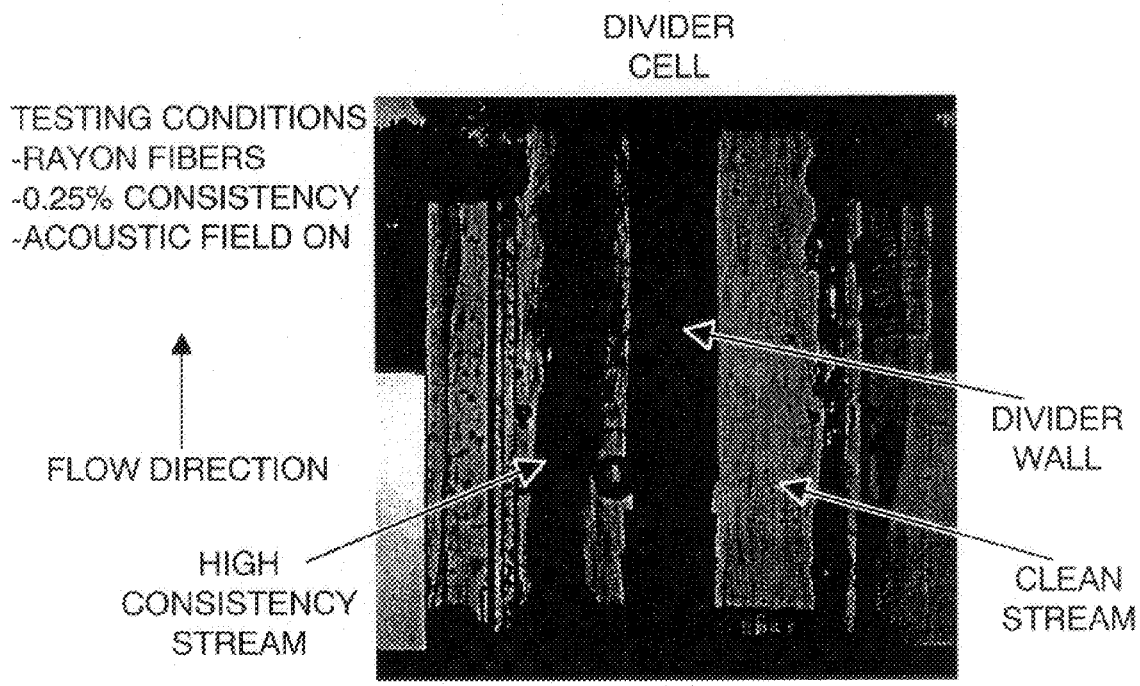

FIGS. 6A and 6B are photographs showing an acoustic cell and a divider cell under testing conditions where no acoustic field is applied to the acoustic cell using Rayon fibers at a consistency of 0.25%. FIGS. 6C and 6D are photographs showing the acoustic cell and the divider cell under the same testing conditions when the acoustic field is now applied to the acoustic cell, herein providing a traveling ultrasonic wave field through the cell. Note particularly the separation along the flow direction of the stream into a high consistency stream to the left of the divider wall, and a clean stream to the right of the divider wall.

Figure 8:
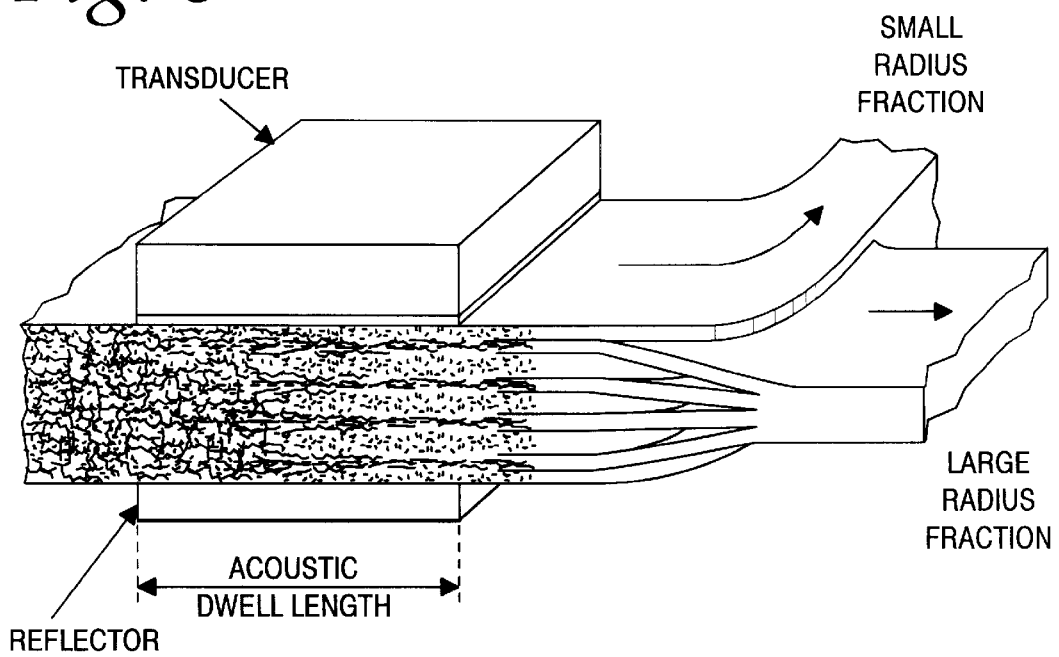
FIG. 8 generally illustrates the use of a proposed divider scheme for acoustic fiber separation concept using a standing wave field.

Qualitative results presented in FIG. 5A through FIG. 5D support the standing wave field acoustic separation scheme illustrated in FIG. 8; wherein a mechanical divider connected to the down stream side of the acoustic cell divides a plurality of agglomeration fraction streams as the concentrated paper fiber stock stream of relatively larger fibers separated out from a plurality of fraction streams substantially free of fibers as the clean stream of the relatively smaller fibers. Large radius fibers are deflected toward anti-nodal particle velocity planes and collected appropriately (see FIG. 4B above). Fiber defection (and separation) can be controlled by varying the flow rate, the acoustic power, the acoustic dwell (length of tranducer 74) and/or the frequency (assuming a broadband transducer 74). While the resonator length would be relatively small (few centimeters), its width would need to be sufficiently large to accommodate an acceptable throughput. Practical consistency would be 0.5 to 2%. Pressurization may be advantageous to eliminate the need for degassed water. Such a pressurized system may also provide additional control by allowing the control of the discharge flow rates as in pressure screen systems.

Figure 7A:
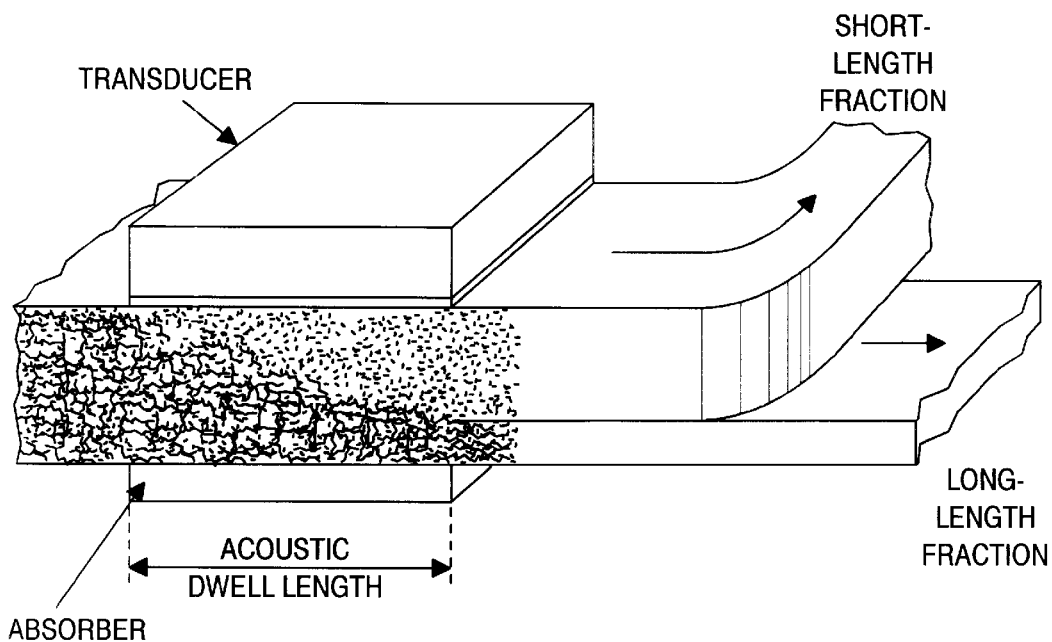
FIG. 7A generally illustrates the use of a proposed divider scheme for acoustic fiber separation concept using a traveling wave field.
Figure 7B:
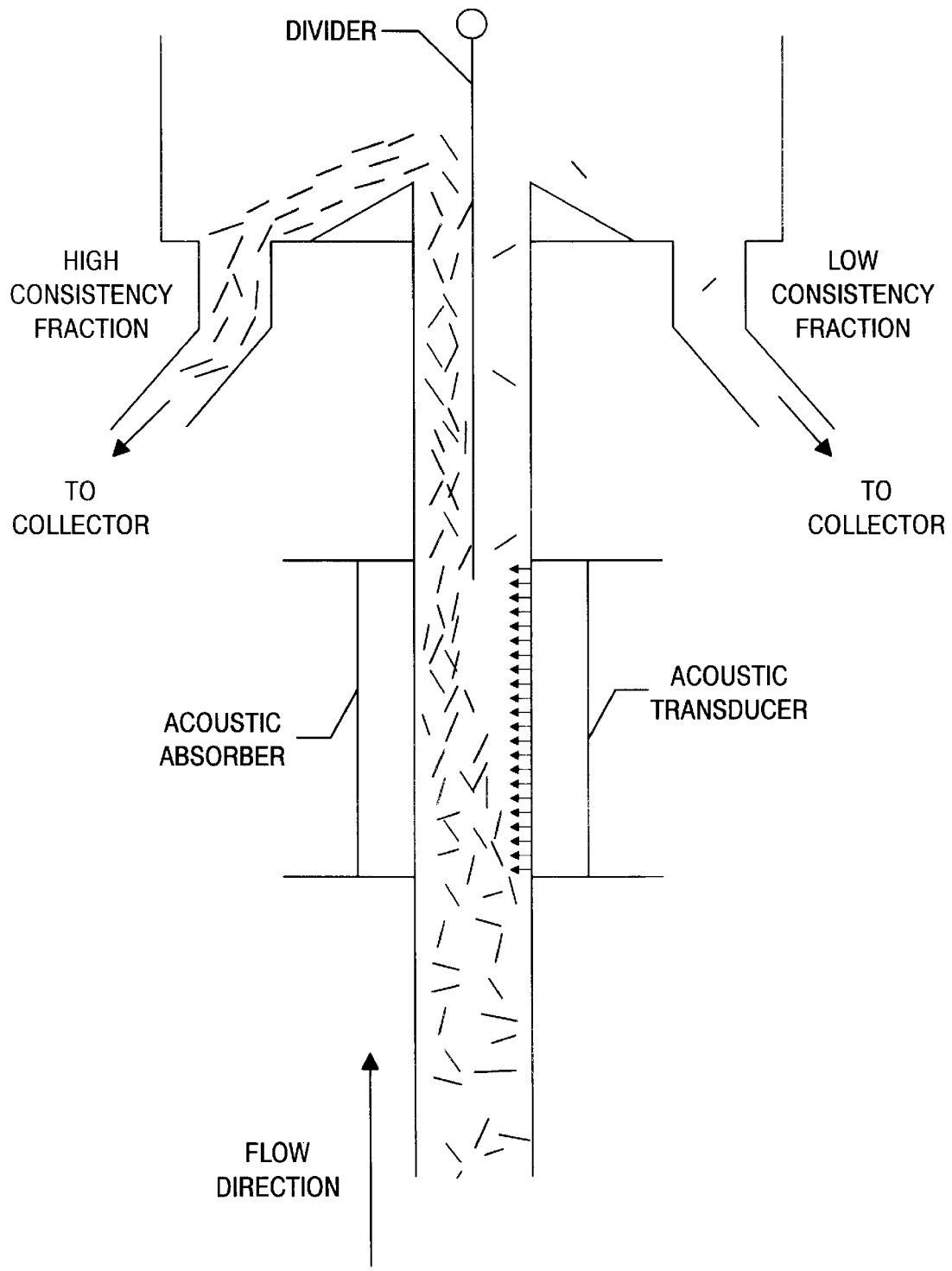
FIG. 7B shows the divider embodiment for acoustic fiber separation using the traveling wave field, specifically for use under the testing conditions of FIGS. 6A–6D above.

A separation scheme similar to the one discussed can be envisioned for a traveling wave field configuration. Here, qualitative results presented in FIG. 5E supports the traveling wave field acoustic separation scheme illustrating a deflection trajectory of fibers penetrating an ultrasonic field imposing agglomeration and reorientation on the fibers of the fiber suspensions to separate the fibers into two fractions. As illustrated in FIGS. 7A and 7B, here mechanical dividers connected to the down stream side of the acoustic cell divides an agglomeration fraction stream as the concentrated paper fiber stock stream of relatively larger fibers separated out from a fraction stream of the relatively smaller fibers. FIG. 7B shows the divider embodiment for acoustic fiber separation using the traveling wave field, specifically for use under the testing conditions of FIGS. 6A–6D above. Again, fiber defection can be controlled by varying the flow rate, the acoustic power, the acoustic dwell and/or the frequency; the transducer-absorber separation distance can also be adjusted depending on the intended application. Moreover, the position of the mechanical divider can be adjusted for additional control over the separation of the concentrated paper fiber stock stream.

Figure 9:
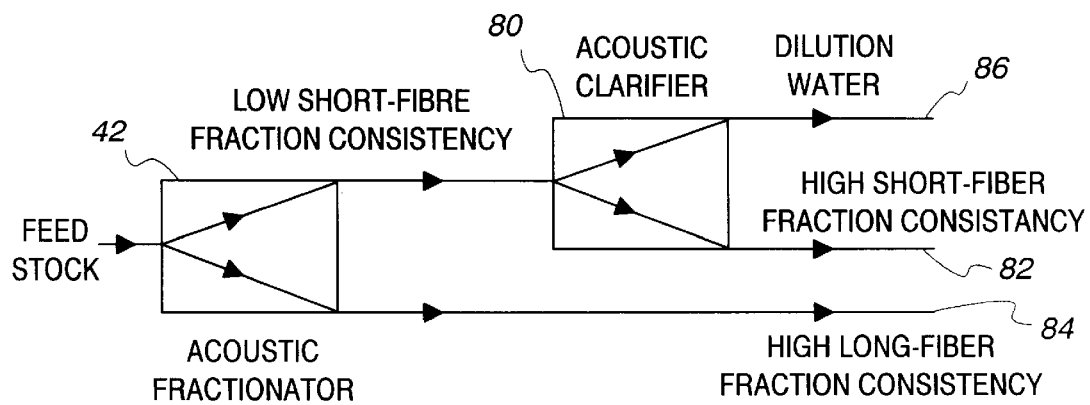
FIG. 9 illustrates the use of the dual concept of acoustic fiber fractionation and clarification.

With reference to FIG. 9, one might take advantage of a higher frequency ultrasonic field to deflect already separated short fibers, and thus provide water for dilution. This is the basis for a dual concept of acoustic fiber fractionation and clarification as shown. This two-stage scheme uses the acoustic fractionator cell 42 and a like cell at higher frequencies, acoustic clarifier to get high short fiber consistency 82 and high long-fiber consistency 84 stocks, and dilution water 86.

The use of a high frequency ultrasonic field may also be used to separate fiber debris or fines from contaminants such as ink particles on the basis that the density would be different in both cases. A more advanced fractionation concept using two traveling wave fields propagating in opposite directions may also be employed for generating waves in the channel of an acoustic cell. Instead of attempting to generate a standing wave field, the two fields (identical or different frequencies) also may be used to position a deflection plane anywhere between the two transmitting transducers providing other fractionation possibilities. Of course, it will be appreciated by those skilled in the art that modifications to the foregoing preferred embodiments may be made in various aspects. The present invention is set forth with particularity in the appended claims. It is deemed that the spirit and scope of that invention encompasses such modifications and alterations to the preferred embodiment as would be apparent to one of ordinary skill in the art and familiar with the teachings of the present application.

What is claimed is:

1. An acoustic cell for subjecting a suspension of fibers to deflection forces, the fibers being of differing relative sizes, the acoustic cell comprising:

an elongated tubular element having at least one inlet channel for receiving at least one continuously moving stream of a fiber suspension in a directed flow, said tubular element having more than one downstream outlet;

an input for receiving time varying signals; and at least one transducer coupled to said input and coupled to said tubular element for generating at least one ultrasonic field which is transverse to said flow and responsive to the time varying signals received at said input, said transducer effective for generating at least one ultrasonic field transverse to said flow of sufficient energy to induce deflections of the fibers penetrating said at least one ultrasonic field, said at least one ultrasonic field effective for imposing agglomeration and reorientation on the fibers of the fiber suspension along a trajectory to separate the fibers into at least two fractions according to the relative sizes of the fibers, said at least one continuously moving stream flowing through said tubular element, and said at least one ultrasonic field separating the fibers of the fiber suspensions into at least two fractions corresponding to at least two outlet streams of fibers at the downstream outlets of said tubular element.

2. An acoustic cell as recited in claim 1 wherein said tubular element comprises four wall sections.

3. An acoustic cell as recited in claim 2 wherein each of said wall sections comprise rectangular removable modular sections.

4. An acoustic cell as recited in claim 2 wherein said transducer comprises piezoelectric ceramic material.

5. An acoustic cell as recited in claim 4 wherein said transducer is designed to resonate at approximately 150 kHz.

6. An acoustic cell as recited in claim 4 wherein said input comprises an electrical input for receiving time varying electrical signals electrically coupling the electrical signals to said piezoelectric ceramic material of said transducer for generating the ultrasonic field responsive to the time varying signals received at said input.

7. An acoustic cell as recited in claim 6 wherein said transducer is coupled to a first one of said wall sections opposite a second one of said wall sections for generating the ultrasonic field to induce the deflections on the fibers of the fiber suspensions between the opposing first and second wall sections.

8. An acoustic cell as recited in claim 7 comprising a reflector plate coupled to said second wall section opposite said transducer for producing a standing wave field between the opposing first and second wall sections.

9. An acoustic cell as recited in claim 7 comprising an absorber plate coupled to said second wall section opposite said transducer for producing a traveling wave field between the opposing first and second wall sections.

10. An acoustic cell as recited in claim 7 comprising a first viewing port on a third one of said wall sections, said third wall section being positioned intermediate said first wall section and said second wall section, for viewing the agglomeration and reorientation of the fibers in the fiber suspension between the opposing first and second wall sections.

11. An acoustic cell as recited in claim 10 comprising a second viewing port on a fourth one of said wall sections, said fourth wall section being positioned intermediate said first wall section and said second wall section and opposite said third wall section, for viewing the agglomeration and reorientation of the fibers in the fiber suspension between the opposing first and second wall sections through the opposing third and fourth wall sections.

12. An acoustic cell as recited in claim 11 wherein said first viewing port and said second viewing port each comprise a glass window.

13. An acoustic fractionator for separating at least one suspension of fibers into plural fractions according to the relative fiber sizes of differing fibers, the acoustic fractionator comprising;

a feed tube which conveys a continuous feed stream of fiber suspension;

an acoustic cell connected to said feed tube which subjects the suspension of fibers to deflection forces;

at least one pump which moves the stream of fiber suspension through the feed tube and acoustic cell, the acoustic cell comprising an elongated tubular element inlet channel which receives the at least one continuously moving stream of fiber suspension in a directed flow, said tubular element having more than one downstream outlet, an input for receiving time varying signals, and at least one transducer coupled to said input and coupled to said tubular element for generating at least one ultrasonic field which is transverse to said flow, and responsive to the time varying signals received at said input, said transducer effective for generating at least one ultrasonic field transverse to said flow of sufficient energy to induce deflections of the fibers penetrating said ultrasonic field, said at least one ultrasonic field effective for imposing agglomeration and reorientation on the fibers of the fiber suspension along a trajectory to separate the fibers into continuously moving streams of at least two fractions according to the relative sizes of the fibers, said fiber suspension flowing into more than one fraction corresponding to said more than one downstream outlet; and a divider connected to said acoustic cell for dividing the continuously moving stream flowing through said tubular element into the more than one isolated fractions according to the relative sizes of the fibers at said downstream outlet of said tubular element.

14. An acoustic fractionator as recited in claim 13 wherein said feed tube conveys paper mill effluents containing pulp slurry recyclable through separation of large radius fibers and small radius fibers into a concentrated paper fiber stock of the relatively larger fibers for paper making and a clean stream of the relatively smaller fibers from the stream of dilute fiber suspension.

15. An acoustic fractionator as recited in claim 14 wherein said pump is a peristaltic pump for moving a continuous feed of pulp slurry through said feed tube.

16. An acoustic fractionator as recited in claim 14 wherein said divider comprises a mechanical divider connected to the down stream side of said acoustic cell for dividing an agglomeration fraction stream as the concentrated paper fiber stock stream of relatively larger fibers separated out from a fraction stream of the relatively smaller fibers.

17. An acoustic fractionator as recited in claim 16 wherein said tubular element comprises four wall sections, said transducer comprises piezoelectric ceramic material, said input comprises an electrical input for receiving time varying electrical signals electrically coupling the electrical signals to said piezoelectric ceramic material of said transducer for generating the ultrasonic field responsive to the time varying signals received at said input, said transducer being coupled to a first one of said wall sections opposite a second one of said wall sections for generating the ultrasonic field to induce the deflections on the fibers of the fiber suspensions between the opposing first and second wall sections, said acoustic cell further comprising an absorber plate coupled to said second wall section opposite said transducer for producing a traveling wave field between the opposing first and second wall sections.

18. An acoustic fractionator as recited in claim 17 wherein said divider comprises a mechanical divider connected to the down stream side of said acoustic cell for dividing an agglomeration fraction stream as the concentrated paper fiber stock stream of relatively larger fibers separated out from a fraction stream substantially free of fibers as the clean stream of the relatively smaller fibers.

19. An acoustic fractionator as recited in claim 16 wherein said tubular element comprises four wall sections, said transducer comprises piezoelectric ceramic material, said input comprises an electrical input for receiving time varying electrical signals electrically coupling the electrical signals to said piezoelectric ceramic material of said transducer for generating the ultrasonic field responsive to the time varying signals received at said input, said transducer being coupled to a first one of said wall sections opposite a second one of said wall sections for generating the ultrasonic field to induce the deflections on the fibers of the fiber suspensions between the opposing first and second wall sections, said acoustic cell further comprising a reflector plate coupled to said second wall section opposite said transducer for producing a standing wave field between the opposing first and second wall sections.

20. An acoustic fractionator as recited in claim 19 wherein said divider comprises a mechanical divider connected to the down stream side of said acoustic cell for dividing a plurality of agglomeration fraction streams as the concentrated paper fiber stock stream of relatively larger fibers separated out from a plurality of fraction streams substantially free of fibers as the clean stream of the relatively smaller fibers.

21. A method of separating at least one suspension into more than one fraction according to the relative fiber sizes of differing fibers, comprising the steps of:

conveying a continuous feed stream of fiber suspension;

transferring the feed stream through an acoustic cell having a tubular element having more than one downstream outlet, said acoustic cell having at least one ultrasonic transducer transverse to said flow for subjecting the least one suspension of fibers to deflection forces in the tubular element of the acoustic cell;

generating at least one ultrasonic field with the ultrasonic transducer upon the channel flow transverse to said flow of sufficient energy to induce deflections of the fibers penetrating said at least one ultrasonic field in the acoustic cell, said at least one ultrasonic field effective for imposing agglomeration and reorientation on the fibers of the fiber suspension along a trajectory to separate the fibers into more than one continuously moving stream of more than one fraction according to the relative sizes of the fibers, the ultrasonic field separating the fibers of the fiber suspension into more than one fraction; and dividing said separated more than one fraction of the at least one fiber suspension at the downstream side of the acoustic cell with the outlets.

* * * * *